US008902794B2

(12) United States Patent
Shah et al.

(10) Patent No.: US 8,902,794 B2
(45) Date of Patent: Dec. 2, 2014

(54) SYSTEM AND METHOD FOR PROVIDING N-WAY LINK-STATE ROUTING REDUNDANCY WITHOUT PEER LINKS IN A NETWORK ENVIRONMENT

(71) Applicant: Cisco Technology, Inc., San Jose, CA (US)

(72) Inventors: Varun Shah, Milpitas, CA (US); Tissa Senevirathne, Sunnyvale, CA (US); Ayan Banerjee, Fremont, CA (US); Ronak Desai, Fremont, CA (US); Raghava Sivaramu, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 169 days.

(21) Appl. No.: 13/629,587

(22) Filed: Sep. 27, 2012

(65) Prior Publication Data
US 2014/0086041 A1    Mar. 27, 2014

(51) Int. Cl.
*H04L 12/28* (2006.01)
*H04L 12/44* (2006.01)

(52) U.S. Cl.
CPC ...................................... *H04L 12/44* (2013.01)
USPC ........................................................ 370/256

(58) Field of Classification Search
None
See application file for complete search history.

(56) References Cited

U.S. PATENT DOCUMENTS

2004/0252634 A1* 12/2004 Regan et al. ................... 370/216
2006/0007951 A1*  1/2006 Meier ............................ 370/449
2007/0008880 A1*  1/2007 Buchko et al. ................ 370/218
2007/0206513 A1*  9/2007 Cho et al. ..................... 370/254
2007/0245034 A1* 10/2007 Retana et al. ................. 709/238
2011/0228780 A1*  9/2011 Ashwood-Smith et al. .. 370/392
2013/0336434 A1* 12/2013 Qin .............................. 375/355

OTHER PUBLICATIONS

"FabricPath Interfaces [Cisco Nexus 7000 Series Switches]", Cisco Systems, Jul. 19, 2012, 11pages; http://www.cisco.com/en/US/docs/switches/datacenter/sw/6_x/nx-os/fabricpath/configuration/guide/fp_interfaces.html.
"IS-IS" from Wikipedia, the free encyclopedia, Jul. 18, 2012; 3 pages http://en.wikipedia.org/wiki/IS-IS.
"Link-state routing protocol" from Wikipedia, the free encyclopedia, Jul. 16, 2012; 5 pages; http://en.wikipedia.org/wiki/Link-state_routing_protocol.
Duffy, Jim, "Dissecting Cisco's FabricPath Ethernet Technology," Network World, Mar. 29, 2012, 4 pages; http://www.networkworld.com/news/2012/032912-cisco-fabricpath-ethernet-257802.html.
Newman, David, "Cisco FabricPath Enables Faster, Simpler, Flatter Data Center Networks," Network World, Oct. 25, 2010, 5 pages http://www.networkworld.com/reviews/2010/102510-cisco-fabricpath-test.html.
Perlman, R. and Eastlake, D., "Introduction to TRILL", The Internet Protocol Journal, vol. 14, No. 3, Sep. 2011, 9 pages http://www.cisco.com/web/about/ac123/ac147/archived_issues/ipj_14-3/143_trill.html.

* cited by examiner

*Primary Examiner* — Otis L Thompson, Jr.
(74) *Attorney, Agent, or Firm* — Patent Capital Group (57) ABSTRACT

A method is provided in one example and includes broadcasting a switching node identifier associated with a first link-state protocol enabled switching node to a plurality of link-state protocol enabled switching nodes. The plurality of link-state protocol enabled switching nodes are in communication with one another by a link-state protocol cloud. The method further includes broadcasting a priority associated with the first link-state protocol enabled switching node to the plurality of link-state protocol enabled switching nodes. The method further includes broadcasting connectivity information of the first link-state protocol enabled switching node to the plurality of link-state protocol enabled switching nodes using the link-state protocol cloud. The connectivity information includes connectivity of the first link-state protocol enabled switching node with at least one spanning tree protocol enabled switching node.

18 Claims, 8 Drawing Sheets

SYSTEM AND METHOD FOR PROVIDING N-WAY LINK-STATE ROUTING REDUNDANCY WITHOUT PEER LINKS IN A NETWORK ENVIRONMENT

TECHNICAL FIELD

This disclosure relates in general to the field of communications and, more particularly, to providing n-way link-state routing redundancy without peer links in a network environment.

BACKGROUND

Spanning Tree Protocol (STP) is a network protocol that attempts to ensure a loop-free topology for a bridged Ethernet local area network by preventing bridge loops. Spanning tree protocol allows a network design to include redundant links to provide automatic backup paths if an active link fails, without the danger of bridge loops, or the need for manual enabling/disabling of these backup links. Spanning Tree Protocol (STP), standardized as IEEE 802.1D, creates a spanning tree within a mesh network of connected layer-2 bridges (typically Ethernet switches), and disables those links that are not part of the spanning tree, leaving a single active path between any two network nodes. However, spanning tree protocol is limited in that it requires the use of only one link of a tree for forwarding traffic in order to prevent loops while another link is wasted. Link-state protocols such as Transparent Interconnect of Lots of Links (TRILL) and FabricPath have been developed to overcome the shortcomings of spanning tree protocol.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

A method is provided in one example and includes broadcasting a switching node identifier associated with a first link-state protocol enabled switching node to a plurality of link-state protocol enabled switching nodes. The switching node identifier can be any suitable identification element in such a context. The plurality of link-state protocol enabled switching nodes can be in communication with one another by a link-state protocol cloud. The method further includes broadcasting a priority (inclusive of a possible relative priority) associated with the first link-state protocol enabled switching node to the plurality of link-state protocol enabled switching nodes. The method further includes broadcasting connectivity information of the first link-state protocol enabled switching node to the plurality of link-state protocol enabled switching nodes using the link-state protocol cloud. The connectivity information can include any suitable data, for example, the connectivity of the first link-state protocol enabled switching node with at least one spanning tree protocol enabled switching node.

In more particular embodiments, the method further includes determining a proxy forwarder node for the at least one spanning tree protocol enabled switching node based upon a priority associated with each of the plurality of link-state protocol enabled switching nodes. The proxy forwarder node is configured to determine a master node forwarder for the at least one spanning tree protocol enabled switching node from the plurality of link-state protocol enabled nodes.

In more particular embodiments, the method further includes associating, for example by the master node forwarder, an identifier of the at least one spanning tree protocol enabled switching node to a multicast tree of the link-state protocol cloud. In still more particular embodiments, the identifier of the at least one spanning tree protocol enabled switching node is an emulated switch identifier associated with the at least one spanning tree protocol enabled switching node.

In still more particular embodiments, the proxy forwarder node determines the master node forwarder based upon connectivity information of each of the plurality of link-state protocol enabled switching nodes with the at least one spanning tree protocol enabled switching node. The method can also include determining a backup node forwarder for the at least one spanning tree protocol enabled switching node. The backup node forwarder is configured to associate the identifier of the at least one spanning tree protocol enabled switching node to the multicast tree if the master node forwarder is determined to not be reachable by the master node forwarder. In still more particular embodiments, the method can include determining a backup proxy forwarder node. The backup proxy forwarder node is configured to determine the master node forwarder for the at least one spanning tree protocol enabled switching node if the proxy forwarder node is determined to be failed.

Example Embodiments

Figure 1:
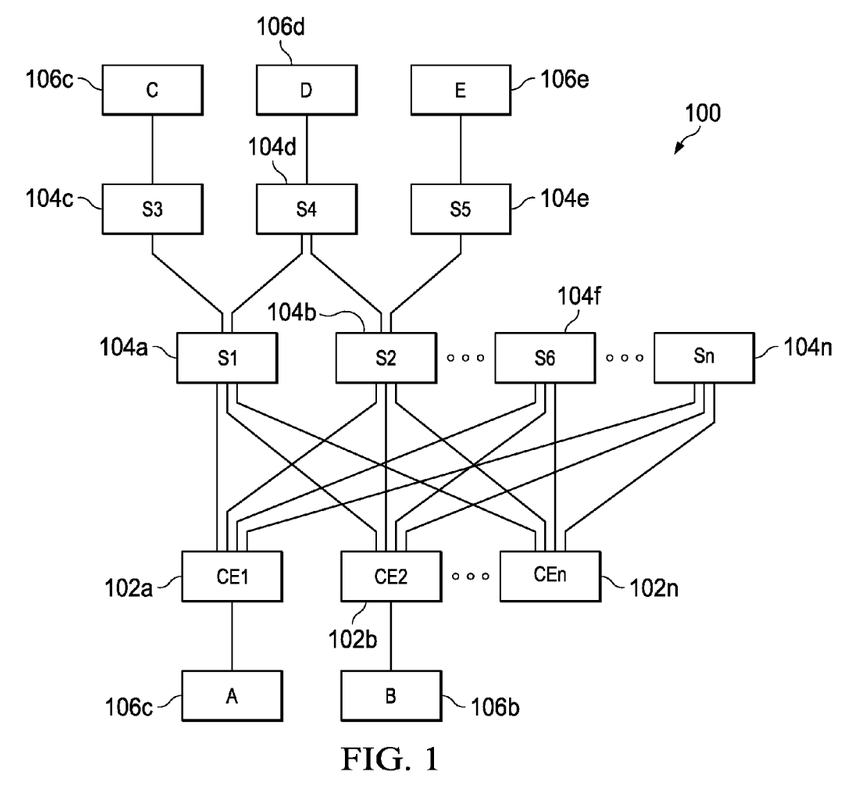
FIG. 1 is a simplified block diagram of an embodiment of a communication system for providing n-way link-state routing redundancy without peer links in a network environment.

Referring to FIG. 1, FIG. 1 is a simplified block diagram of an embodiment of a communication system 100 for providing n-way link-state routing redundancy without peer links in a network environment. Communication system 100 of FIG. 1 includes a number N of classical Ethernet switches including a first classical Ethernet switch (CE1) 102a, a second classical Ethernet switch (CE2) 102b up to an Nth classical Ethernet switch ($CE_N$) 102N. in the particular embodiment illustrated in FIG. 1, classical Ethernet switches 102a-102N support a traditional Spanning Tree Protocol (STP). Communication system 100 further includes a number n of link-state protocol enabled switches including a first switch (S1) 104a, a second switch (S2) 104b, a third switch (S3) 104c, a fourth switch (S4) 104d, a fifth switch (S5) 104e, and a sixth switch (S6) 104f up to an nth switch ($S_n$) 104n. In the particular embodiment illustrated in FIG. 1, each of switches 104a-104n support a link-state protocol, such as FabricPath or Transparent Interconnect of Lots of Links (TRILL), and are enabled with an n-way link-state routing protocol as further described herein. Switches 104a-104n form a link-state protocol cloud. In one particular embodiment, switches 104a-104n form a Fabricpath cloud. Communication system 100 further includes a host A 106a, a host B 106b, a host C 106c, a host D 106d, and a host E 106e.

First classical Ethernet switch (CE1) 102a is in communication with first switch (S1) 104a, second switch (S2) 104b, sixth switch (S6) 104f up to nth switch ($S_n$) 104n. Similarly, second classical Ethernet switch (CE2) 102b is also in communication with first switch (S1) 104a, second switch (S2) 104b, and sixth switch 104f up to nth switch ($S_n$) 104n. Further, each of the classical Ethernet switches up to Nth classical Ethernet switch ($CE_N$) 102N are each in communication with first switch (S1) 104a, second switch (S2) 104b, sixth switch (S6) 104f up to nth switch ($S_n$) 104n. First switch (S1) 104a and second switch (S2) 104b are further in communication with third switch (S3) 104c, fourth switch (S4) 104d, and fifth switch (S5) 104e. Switches 104a-104n form a link state protocol cloud. In a particular embodiment, switches 104a-104n are enabled with a FabricPath protocol and form a Fabricpath cloud. Although various embodiments described herein are described using FabricPath as an example, it should be understood that in other embodiments any suitable protocol may be used. For example, in still another embodiment switches 104a-104n are enabled with a TRILL protocol and form a TRILL cloud.

Host A 106a is in communication with first classical Ethernet switch (CE1) 102a and host B 106b is in communication with second classical Ethernet switch (CE2) 102b. Host C 106c is in communication with third switch (S3) 104c, host D 106d is in communication with fourth switch (S4) 104d, and host E 106e is in communication with fifth switch (S5) 104e. Host A 106a, host B 106b, host C 106c, host D 106d, and host E 106e can be associated with clients, customers, or end users wishing to initiate a communication in communication system 100 via some network. The term 'host' is inclusive of devices used to initiate a communication, such as a receiver, a computer, a set-top box, an Internet radio device (IRD), a cell phone, a smart phone, a tablet, a personal digital assistant (PDA), a Google droid, an iPhone, and iPad, or any other device, component, element, or object capable of initiating voice, audio, video, media, or data exchanges within communication system 100. One or more of host A 106a, host B 106b, host C 106c, host D 106d, and host E 106e may also be inclusive of a suitable interface to the human user, such as a display, a keyboard, a touchpad, a remote control, or other terminal equipment. One or more of host A 106a, host B 106b, host C 106c, host D 106d, and host E 106e may also be any device that seeks to initiate a communication on behalf of another entity or element, such as a program, a database, or any other component, device, element, or object capable of initiating an exchange within communication system 100. Data, as used herein in this document, refers to any type of numeric, voice, video, media, or script data, or any type of source or object code, or any other suitable information in any appropriate format that may be communicated from one point to another.

In one particular instance, communication system 100 can be associated with a service provider digital subscriber line (DSL) deployment. In other examples, communication system 100 would be equally applicable to other communication environments, such as an enterprise wide area network (WAN) deployment, cable scenarios, broadband generally, fixed wireless instances, fiber to the x (FTTx), which is a generic term for any broadband network architecture that uses optical fiber in last-mile architectures. Communication system 100 may include a configuration capable of transmission control protocol/internet protocol (TCP/IP) communications for the transmission and/or reception of packets in a network. Communication system 100 may also operate in conjunction with a user datagram protocol/IP (UDP/IP) or any other suitable protocol, where appropriate and based on particular needs.

Figure 4:
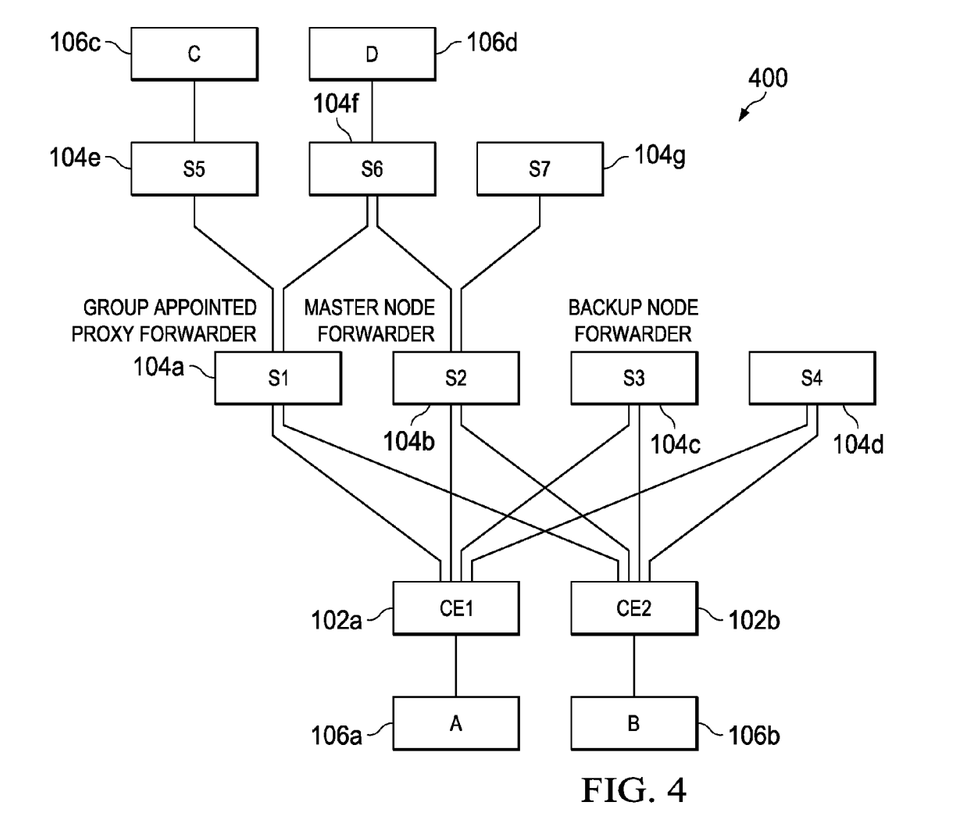
FIG. 4 is a simplified block diagram of another embodiment of a communication system for providing n-way link-state routing redundancy without peer links in a network environment.

Switches 102a-102n are network elements that facilitate multicast flows between hosts and/or sources in a given network (e.g., for networks such as those illustrated in FIGS. 1 and 4). As used herein in this Specification, the term 'network element' is meant to encompass routers, switches, gateways, bridges, loadbalancers, firewalls, inline service nodes, proxies, servers, processors, modules, or any other suitable device, component, element, proprietary appliance, or object operable to exchange information in a network environment. This network element may include any suitable hardware, software, components, modules, interfaces, or objects that facilitate the operations thereof. This may be inclusive of appropriate algorithms and communication protocols that allow for the effective exchange of data or information.

In one implementation, switches 104a-104n may include software to achieve (or to foster) the n-way link-state routing redundancy protocol, as outlined herein in this Specification. Note that in one example, each of these elements can have an internal structure (e.g., a processor, a memory element, etc.) to facilitate some of the operations described herein. In other embodiments, these n-way link-state routing redundancy operations may be executed externally to these elements, or included in some other network element to achieve this intended functionality. Alternatively, switches 104a-104n may include this software (or reciprocating software) that can coordinate with other network elements in order to achieve the operations, as outlined herein. In still other embodiments, one or several devices may include any suitable algorithms, hardware, software, components, modules, interfaces, or objects that facilitate the operations thereof.

For purposes of illustrating certain example techniques of communication system 100, it is important to understand the communications that may be traversing the network. The following foundational information may be viewed as a basis from which the present disclosure may be properly explained.

Figure 2:
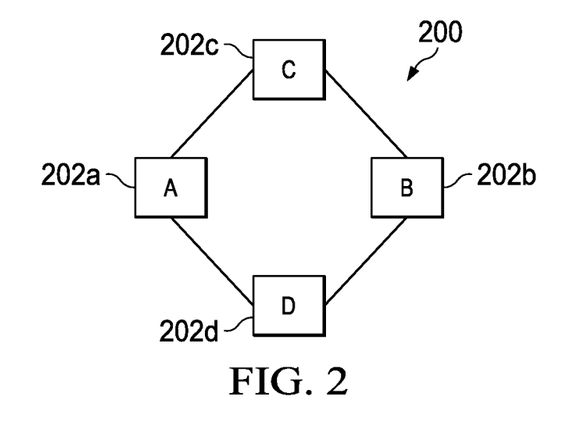
FIG. 2 illustrates an example of a communication system configured for Spanning Tree Protocol (STP) in a diamond network topology.

Referring now to FIG. 2, FIG. 2 illustrates an example of a communication system 200 configured for Spanning Tree Protocol (STP) in a diamond network topology. In the diamond topology of FIG. 2, node A 202a is at the left side of the diamond topology, node B 202b is at the right of the diamond topology, node C 202c is at the top of the diamond topology, and node D 202d is at the bottom of the diamond topology. Each of node A 202a, node B 202b, node C, 202c, and node D 202d are network nodes that are enabled with STP, such as classical Ethernet switches. Node A 202a is connected to node C 202c and node D 202d. Node B 202b is connected to node C 202c and node D 202d. Node C 202c is connected to node A 202a and node B 202b. Finally, node D 202d is connected to node A 202a and node B 202b.

Spanning Tree Protocol (STP) is a network protocol that attempts to ensure a loop-free topology for a bridged Ethernet local area network by preventing bridge loops. Spanning tree protocol allows a network design to include redundant links to provide automatic backup paths if an active link fails, without the danger of bridge loops, or the need for manual enabling/disabling of these backup links. Spanning Tree Protocol (STP), standardized as IEEE 802.1D, creates a spanning tree within a mesh network of connected layer-2 bridges (typically Ethernet switches), and disables those links that are not part of the spanning tree, leaving a single active path between any two network nodes. However, spanning tree protocol is limited in that it requires the use of only one link of a tree for forwarding traffic in order to prevent loops while another link is wasted.

If node D 202d wishes to send traffic to node C 202d, ideally node D 202d could send the traffic through either a link through node A 202a to node C 202c or a link through node B 202b to node C 202c. However, STP will require only one of the links to be used. For example, STP may require that only the link passing through node A 202a is used to send traffic from node D 202d to node C 202c. The other link from node D 202d to node C 202c through node B 202b cannot be used and is therefore wasted.

Link-state protocols such as Transparent Interconnect of Lots of Links (TRILL) and FabricPath have been developed to overcome the shortcomings of STP. Essentially TRILL and Fabricpath are two link-state protocol technologies that were developed to replace Spanning Tree Protocol (STP) in the Ethernet space. TRILL and Fabricpath technologies allow for the use of all possible links in a topology. Fabricpath was developed by Cisco and TRILL is an IETF standard. Both Fabricpath and TRILL use Intermediate System To Intermediate System (IS-IS) as the routing protocol used to create a loop free topology as well as to create multiple paths. IS-IS is a link-state routing protocol designed to move information efficiently within a computer network, a group of physically connected computers or similar devices. It accomplishes this by determining the best route for datagrams through a packet-switched network. The IS-IS protocol was defined in ISO/IEC 10589:2002 as an international standard within the Open Systems Interconnection (OSI) reference design. Though originally an ISO standard, the IETF republished the protocol as an Internet Standard in RFC 1142. IS-IS operates by reliably flooding link state information throughout a network of routers or switches. Each IS-IS router or switch independently builds a database of the network's topology and aggregates the flooded network information. IS-IS uses Dijkstra's algorithm for computing the best path through the network.

Packets or datagrams are then forwarded through the network to the destination based on the computed ideal path.

Regarding the TRILL protocol, TRILL switches run a link state protocol amongst themselves. In a link state protocol connectivity is broadcast to all the TRILL switches, so that each TRILL switch knows about all the other TRILL switches, and the connectivity between them. This gives the TRILL switches enough information to compute pair-wise optimal paths for unicast traffic, and calculate distribution trees for delivery of frames either to destinations whose location is unknown or to multicast/broadcast groups. TRILL uses IS-IS link state routing protocol because it runs directly over Layer 2, so it can be run without configuration, i.e., no IP addresses need to be assigned, and it is easy to extend by defining new TLV (type-length-value) data elements and sub-elements for carrying TRILL information. To mitigate temporary loop issues, TRILL switches forward based on a header with a hop count. TRILL switches also specify the next hop TRILL switch as the frame destination when forwarding unicast frames across a shared-media link. This avoids the spawning of additional copies of frames during a temporary loop. A Reverse Path Forwarding check and other checks are performed on multi-destination frames to further control potentially looping traffic.

In a typical use of TRILL, the first TRILL switch that a unicast frame encounters in encapsulates the received frame with a TRILL header that specifies the last TRILL switch where the frame is decapsulated. The first TRILL switch is known as the "ingress RBridge" and the second TRILL switch is known as the "egress RBridge." To save room in the TRILL header and simplify forwarding lookups, a dynamic nickname acquisition protocol is run among the TRILL switches to select two-octet nicknames for the TRILL switches which are unique within the network, and which are an abbreviation for the six-octet IS-IS system ID of the TRILL switch. The two-octet nicknames are used to specify the ingress and egress RBridges in the TRILL header. The TRILL header consists of six octets. The first two octets include a 6-bit decrementing hop count, plus flags, the next two octets contain the egress RBridge nickname, and the final two octets contain the ingress RBridge nickname. For multi-destination frames, the "egress RBridge nickname" specifies a distribution tree for the frame, where the nicknamed TRILL switch is the root of the distribution tree. The ingress RBridge selects which distribution tree the frame should travel along.

Even though TRILL switches are transparent to layer 3 devices, and all the links interconnected by TRILL switches appear to layer 3 devices to be a single link, TRILL switches act as link routers in the sense that, in the forwarding of a frame by a transit TRILL switch, the outer layer 2 header is replaced at each hop with an appropriate layer 2 header for the next hop, and the hop count is decreased. Despite these modifications of the outer layer 2 header and the hop count in the TRILL Header, the original encapsulated frame is preserved, including the original frame's virtual LAN (VLAN) tag. Multipathing of multi-destination frames through alternative distribution tree roots and ECMP (Equal Cost MultiPath) of unicast frames are supported. Networks with a more mesh-like structure will benefit to a greater extent from the multipathing and optimal paths provided by TRILL than will networks with a more tree-like structure.

Similarly, Fabricpath is a link-state protocol developed by Cisco that uses the IS-IS routine protocol to implement Shortest Path First (SPF) routing to determine reachability and path selection in a network cloud. Fabricpath uses the IS-IS routing protocol with Fabricpath-specific extensions such as exchanging switch ID (SID) reachability instead of IP prefixes. Fabricpath may also employ equal-cost multipath (ECMP) forwarding to make use of all available bandwidth. Fabricpath-enabled switches differ from classical Ethernet switches in at least two ways: they compute layer 2 paths using control messages carried over IS-IS, the routing protocol, and they encapsulate incoming Ethernet frames with a Fabricpath header. This header contains routable source and destination switch addresses and a time-to-live field for loop prevention. In contrast to STP, Fabricpath creates a single switch fabric across all participating switches, increasing available bandwidth within a single layer-2 domain. Fabricpath also reduces broadcast flooding and media access control (MAC) address table size, both well-known issues with large layer-2 networks. Fabricpath switches use multicast rather than flooding to forward frames sent to unknown destinations, and compute routing tables with information learned from the fabric and source MAC addresses learned on each edge switch. Moreover, using an approach called "conversational learning," switches populate MAC address tables only for ports actually involved in conversations. This differs from conventional switching, where switches see all flooded traffic within a broadcast domain and put every address into their MAC tables. In contrast, Fabricpath switches don't need large MAC address tables, even when layer-2 domains encompass tens of thousands of hosts.

A virtual PortChannel (vPC) allows links that are physically connected to two different switches to appear as a single PortChannel to a third device. This provides a loop free topology eliminating the spanning-tree-blocked ports and maximizing the bandwidth usage. In a FabricPath network, a classical (not FabricPath-enabled) Ethernet switch can be connected through a port channel to two FabricPath edge switches by using a configuration construct called emulated switch. The emulated switch implementations in FabricPath, where two FabricPath edge switches provide a vPC to a third-party device, is called vPC+. vPC+ carries the vPC legacy into the Fabricpath world by offering a migration solution for users or customers who desire to migrate from Classical Ethernet to TRILL or Fabricpath.

Emulated switch is a construct in which two FabricPath switches emulate a single switch to the rest of the FabricPath network. The packets originated by the two emulated switches are sourced with the emulated switch ID. The other FabricPath switches are not aware of this and simply see the emulated switch, identified by a dedicated switch ID value called the emulated switch ID, as reachable through both switches. This means that the two emulated switches have to be directly connected via peer link, and there should be a peer-keep alive path between the two switches to form the vPC+.

Referring again to FIG. 1, vPC allows first classical Ethernet switch (CE1) 102a to connect to first switch (S1) 104a, second switch (S2) 104b, and sixth switch (S6) through nth switch (Sn) 104n such that first switch (S1) 104a, second switch (S2) 104b, and sixth switch (S6) through nth switch (Sn) 104n appear as a single device to first classical Ethernet switch (CE1) 102a. vCP allows first classical Ethernet switch (CE1) 102a to have multiple links to first switch (S1) 104a and bundle those links to appear as one link. vPC further allows first classical Ethernet switch (CE1) 102a to have multiple links to not just first switch (S1) 104a, but also to second switch (S2) 104b, sixth switch (S6) 104f . . . nth switch (Sn) 104n and bundle them into a single link which is called the virtual port channel. vPC+ provides a similar functionality into the FabricPath domain in which first switch (S1) 104a and second switch (S2) 104b connect to first classical Ethernet switch (CE1) 102a and appear as a single node to any other node in the network cloud above such as third switch (S3) 104c, fourth switch (S4) 104d, and fifth switch (S5) 104e.

With current vPC+ implementations, a physical peer link between first switch (S1)) 104a and second switch (S2) 104b is required, for example, to exchange certain connectivity data. For n-way vPC+ with a current implementation, connectivity between first classical Ethernet switch CE1 (102a) and switches 104a-104n would require that each switch 104a-104b have a peer link with every other switch 104a-104n. To set up such a mesh using current vPC+ technology is not a scalable solution. Existing vPC+ implementations have limitations such as the ability to only provide two-way redundancy, and requiring cross connect peer links between boundary switches. In addition, current vPC+ solutions are unable to offer N-way redundancy. Further, existing vPC+ solutions allow use of only two switches, for example, first switch (s1) 104a and second switch (S2) 104b to emulate a switch identifier (ID) and requires the use of a peer-link between first switch (s1) 104a and second switch (S2) 104b. Accordingly, using the existing vPC+ solutions, a classical Ethernet switch such as first classical Ethernet switch (CE1) 102a can reach the Fabricpath cloud only through either first switch (s1) 104a and second switch (S2) 104b even if first classical Ethernet switch (CE1) 102a has multiple uplinks to the Fabricpath cloud.

Various embodiments described herein provide for seamless integration of Classical Ethernet infrastructure with a link-state infrastructure such as a TRILL or Fabricpath infrastructure and provide n-way active-active forwarding, with minimum configuration by running a new reliable multicast distribution protocol to distribute link routing information in a cloud. The N-way link-state routing protocol described in various embodiments herein provides for the connection of as many peer switches as desired into a cloud without requiring a peer link between any of the switches. For example, referring again to FIG. 1, using the N-way link routing protocol further described herein first classical Ethernet switch (CE1) 102a is able to connect to switches 104a-104b and 104f-104n without requiring any physical peer connections between switches 104a-104n through the switches 104a-104n exchanging connectivity information over a link-state protocol cloud. The link-state protocol enabled switches 104a-104n are in communication with one another by the link-state protocol cloud. In a particular embodiment, the link-state protocol cloud is a Fabricpath cloud. In still another particular embodiment, the link-state protocol cloud is a TRILL cloud.

One or more embodiments of the N-way link-state routing protocol described herein support N switches within a cloud to emulate a switch identifier (ID)/nickname without needing a peer link by running a reliable multicast distribution protocol on all switches that need to emulate a switch-id/nickname to exchange information in order to correctly advertise an association of the switch with a switch ID/nickname and a tree id. Further, the reliable multicast distribution protocol relays this information to the Fabricpath control plane, which then sends the information across the Fabricpath cloud to achieve N way connectivity of each classical Ethernet (CE) switch to the Fabricpath cloud.

In accordance with various embodiments, switches 104a-104n each are enabled with an N-way link-state routing protocol. In at least one embodiment, the N-way link routing protocol is a multicast distribution protocol used by the switches 104a-104n to communicate connectivity information among one other. The connectivity information includes information regarding the individual connectivity of the switches 104a-104n to one or more the classic Ethernet switches 102a-102N information.

In accordance with various embodiments, the connectivity information carried by the protocol includes an identifier for the particular switch 104a-104n, a switch priority value, and the connectivity of each switch 104a-104n to one or more of classical Ethernet switches 102a-102n. In a particular embodiment, the identifier associated with switches 104a-102b is the backplane Media Access Control (MAC) address of the particular switch 104a-104n nodes. The priority information is used to determine which of the switches 104a-104b will function as a Group Appointed Proxy Forwarder (GAPF), a Master Node Forwarder (MNF), and a Backup Node Forwarder (BNF) for a given set of boundary nodes, such as one or more of switch 104a-104n, and classic Ethernet switches such as one or more of classic Ethernet switches 102a-102n. The functions of the GAPF, MNF, and BNF will be further described herein.

Figure 3:
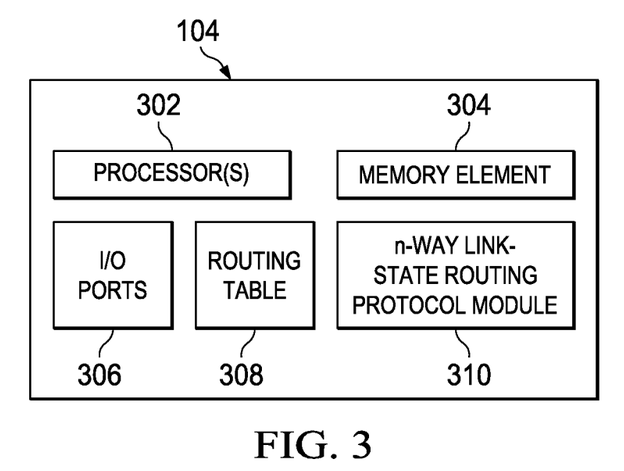
FIG. 3 illustrates an embodiment of a link-state routing protocol enabled switch according to one embodiment.

Referring now to FIG. 3, FIG. 3 illustrates an embodiment of a link-state routing protocol enabled switch 104 according to one embodiment. Switch 104 may include one or more of switches 104a-104n of FIG. 1. Switch 104 includes one or more processor(s) 302, a memory element 304, I/O ports 306, a routing table 308, and n-way link-state routing protocol module 310. Processor(s) 302 is configured to execute various tasks of switch 104 as described herein and memory element 304 is configured to store data associated with switch. I/O ports 306 are configured to interface with one or more of classical Ethernet switches 102a-102n, another link-state protocol enabled switch 104a-104n, and/or hosts 106a-106e. Routing table 308 is configured to store link-state and other routing information associated with switch 104. N-way link-state routing protocol module 310 is configured to implement the various functions of the N-way link-state routing protocol as further described herein.

In one implementation, switch 104 is a network element that includes software to achieve (or to foster) the N-way link-state routing protocol operations, as outlined herein in this Specification. Note that in one example, each of these elements can have an internal structure (e.g., a processor, a memory element, etc.) to facilitate some of the operations described herein. In other embodiments, these N-way link-state routing protocol operations may be executed externally to this elements, or included in some other network element to achieve this intended functionality. Alternatively, switch 300 may include this software (or reciprocating software) that can coordinate with other network elements in order to achieve the operations, as outlined herein. In still other embodiments, one or several devices may include any suitable algorithms, hardware, software, components, modules, interfaces, or objects that facilitate the operations thereof.

Referring to FIG. 4, FIG. 4 is a simplified block diagram of another embodiment of a communication system 400 for providing n-way link-state routing redundancy without peer links in a network environment. Communication system 400 of FIG. 4 includes first classical Ethernet switch (CE1) 102a, and second classical Ethernet switch (CE2) Communication system 400 further includes first switch (S1) 104a, second switch (S2) 104b, third switch (S3) 104c, fourth switch (S4) 104d, fifth switch (S5) 104e, sixth switch (S6) 104f, and seventh switch (S7) 104g. In the particular embodiment illustrated in FIG. 4, each of switches 104a-104n support the n-way link-state protocol as further described herein and form a link-state protocol cloud. Communication system 400 further includes host A 106a, host B 106b, host C 106c, and host D 106d.

First classical Ethernet switch (CE1) 102a is in communication with first switch (S1) 104a, second switch (S2) 104b, third switch (S3) 104c, and fourth switch (S4) 104d. Similarly, second classical Ethernet switch (CE2) 102b is also in communication with first switch (S1) 104a, second switch (S2) 104b, third switch (S3) 104c, and fourth switch (S4) 104d. First switch (S1) 104a and second switch (S2) 104b are further in communication with fifth switch (S5) 104e, sixth switch (S6) 104f, and seventh switch (S7) 104g. In the particular embodiment illustrated in FIG. 4, switches 104a-104g are enabled with a FabricPath protocol and form a Fabricpath cloud. In the particular embodiment illustrated in FIG. 4, switches 104a-104d are edge switches representing the edge of the cloud with respect to communication with classical Ethernet switches 102a-102b. Although the embodiment of FIG. 4 is described using FabricPath as an example, it should be understood that in other embodiments any suitable protocol may be used. For example, in still another embodiment switches 104a-104g of FIG. 4 are enabled with a TRILL protocol and form a TRILL cloud.

Host A 106a is in communication with first classical Ethernet switch (CE1) 102a and host B 106b is in communication with second classical Ethernet switch (CE2) 102b. Host C 106c is in communication with fifth switch (S5) 104e, host D 106d is in communication with sixth switch (S6) 104g. Although the communication system of FIG. 4 is illustrated as using a fixed number of nodes for simplicity of description, it should be understood that in other embodiments any number of nodes may be included in communication system 400.

In accordance with various embodiments, each of the classical Ethernet (CE) switches 102a-102b are advertised using a unique nickname by each of the edge switches 104a-104d it is connected to provided the number of trees in the Fabricpath cloud is more than the number of edge switches 104a-104d. In one or more embodiment, the unique nickname for a particular classical Ethernet (CE) switch is an emulated switch ID of the CE switch. A tree represents a forwarding path including links through the edge switches 104a-104d for traffic to transit within the cloud. If the number of trees is less than the number of uplinks that a particular CE switch 102a-102b has to edge switches 104a-104d, the surplus links will be held in standby and made active upon failure of a link already in use. Each of the edge switches 104a-104d connected to a classical Ethernet switch 102a-102b advertises the particular classical Ethernet switches 102a-102b as leaf nodes of the tree to the other edge switches 104a-104d. In particular embodiments, the edge switches 104a-104d advertises via either an existing nickname type-length-value (TLV) data element or via a new IS-IS TLV called a TRILL local Reachability TLV as will be further described herein. For example, first edge switch (S1) 104a announces a nickname for first classical Ethernet switch (CE1) 102a along with a nickname that uniquely identifies first edge switch (s1) 104a. First edge switch (S1) 104a also announces an affinity TLV with the nickname for first classical Ethernet switch (CE1) 102a and a tree value on which first classical Ethernet switch (CE1) 102a should hang off of first edge switch (S1) 104a for delivering multicast traffic.

For each of the CE switches 102a-102b, there can be multiple servers, clients, or hosts behind it sending traffic into the cloud. For example, for first CE switch (CE1) 102a, traffic coming from behind these servers may be destined either to servers, clients, or hosts behind the second CE switch (CE2) 10, another classical Ethernet switch in the network, or to nodes that are outside the cloud behind fifth switch (S5) 104e, sixth switch (S6) 104f, and seventh switch (S7) 104g. For any traffic that first Classical Ethernet switch (CE1) 102a pushes onto the network, it uses an emulated switch ID, for example an emulated switch ID CE1 instead of, for example, a switch ID of first switch (S1) 104a and second switch (S2) 104b since first switch (S1) 104a and second switch (S2) 104b are going to eventually pump that traffic into the cloud. Because there can be multiple traffic sources connected behind the classical Ethernet (CE) switches, there is a need to have multiple emulated switch IDs that first switch (S1) 104a and second switch (S1) 104b can use depending on where the traffic they receive originated from. Since there may be hundreds of data sources behind each CE switch, it is desirable to restrict the number of MAC addresses that are learned off one switch ID. The use of multiple emulated switch IDs behind switches 104a-104d and the tying of emulated switch IDs to particular trees enables this.

An advantage of at least one embodiment is that the IS-IS protocol adds classical Ethernet (CE) nodes as leaf nodes or advertising/originating nodes without having to modify an existing Shortest Path First (SPF) routing algorithm. The complexity of SPF does not increase with this process since the number of intermediate systems (IS's) that the SPF algorithm calculates is still the same. There are just extra leaves that each node needs to add. Level 3 (L3) IS-IS handles many more IP prefixes per switch/router. If the complexity with N switches (with N nicknames) is O(n) then in this case with N+M(emulated nicknames) it will be O(N)+x(time to digest M nicknames)<<0(N+M).

In accordance with the n-way link-state routing protocol of various embodiments, one of the edge switches 104a-104n is designated as a Group Appointed Proxy forwarder (GAPF) for a given set of boundary nodes and CE nodes and for a given tree. The GAPF decides the edge switch through which each of CE nodes will attach on a given multicast tree. The number of available multicast trees should be greater than or equal to the number of edge switches. Each CE node connects to all of the multicast trees through one of the edge switches. If the number of edge switches is less than the number of trees then the CE switch hangs off the edge switches in a round robin fashion based on predetermined priorities. In short, for each edge (or boundary) switch/classical Ethernet switch {bRB, CE} pair there is a multicast tree (MTr). The particular edge switch (bRB) uses the multicast tree (MTr) to forward traffic it receives from the classical Ethernet (CE) switch.

Edge switches 104a-104d run the n-way link-state routing protocol. As part of this protocol, edge switches 104a-104d send HELLO messages to each other. HELLO messages are messages sent within a network to announce connectivity. The HELLO messages include the unique identifier of the particular edge switch 104a and a GAPF priority representative of the priority of the particular edge switch 104a-104d in being selected as the GAPF. In one or more embodiments, the unique identifier of the particular edge switch 104a-104n is the backplane MAC address of the particular edge switch 104a-104d. In other embodiments, the unique identifier of the particular edge switch 104a-104d is a configurable value, such as a six-byte configurable value. The HELLO message from a particular edge switch 104a-104d further include a list of classical Ethernet (CE) switches, such as one or more of classical Ethernet switches 102a-102b, to which the particular edge switch 104a-104d is connected to along with the status of the link, i.e., either UP or DOWN, between the particular edge switch 104a-104d and the particular classical Ethernet switch 102a-102. Although, various embodiments are described as using HELLO messages to send connectivity information, it should be understood that in other embodiments any type of connectivity message may be used.

Upon receiving the HELLO message from all of the edge switches in the cloud, each of the edge switches 104a-104d runs a common algorithm to elect the GAPF as well as a back-up GAPF (BGAPF) for the particular classical Ethernet (CE) switch and the associated multicast tree. In at least one embodiment, the algorithm to select the GAPF includes selecting the edge switch having the highest GAPF priority value with any ties broken by selecting the edge switch having the higher MAC address. The Group Appointed Proxy Forwarder then elects one of the edge switches as a Master Node Forwarder (MNF) and another of the edge switches as a Backup Node Forwarder (BNF). The MNF, or alternately, the BNF, announces each classical Ethernet (CE) switch's association with a particular multicast tree to the rest of the edge switches using the emulated switch ID of the particular classical Ethernet switch. For a different classical Ethernet switch different ones of the edge switches 104a-104b may be chosen as the GAPF, MNF, and BNF to announce an emulated switch ID on another tree. In at least one embodiment, each edge switch 104a-104d may be used to tie one emulated switch ID to one tree. In still other embodiments, a multiple of trees are configured such that the emulated switch ID may be tied to any number of nodes.

For example, assuming first edge switch (S1) 104a is selected as the GAPF and second edge switch S2 is selected as the back-up GAPF (BAGPF). First edge switch (S1) 104a calculates a pair of switches, for example, first edge switch (S1) 104a and second edge switch (S2) 104b for every classical Ethernet (CE) switch that hangs off more than two edge switches. Based on information obtained from the HELLO messages, first edge switch (S1) 104a in its role as the GAPF will elect first edge switch (S1) 104a as the MNF and second edge switch (S2) 104b as the BNF. In that case first classical Ethernet switch (CE1) 102a will hang off first edge switch (S1) 104a for multicast Tree 1. In a circumstance in which the link between first classical Ethernet switch (CE1) 102a and first edge switch (S1) 104a fails, first classical Ethernet switch (CE1) 102a will hang off and second edge switch (S2) 104b for Tree 1. In a particular embodiment, GAPF control information is advertised by first edge switch (S1) 104a in a nickname TLV and the multicast tree association is announced in an affinity TLV.

Figure 5:
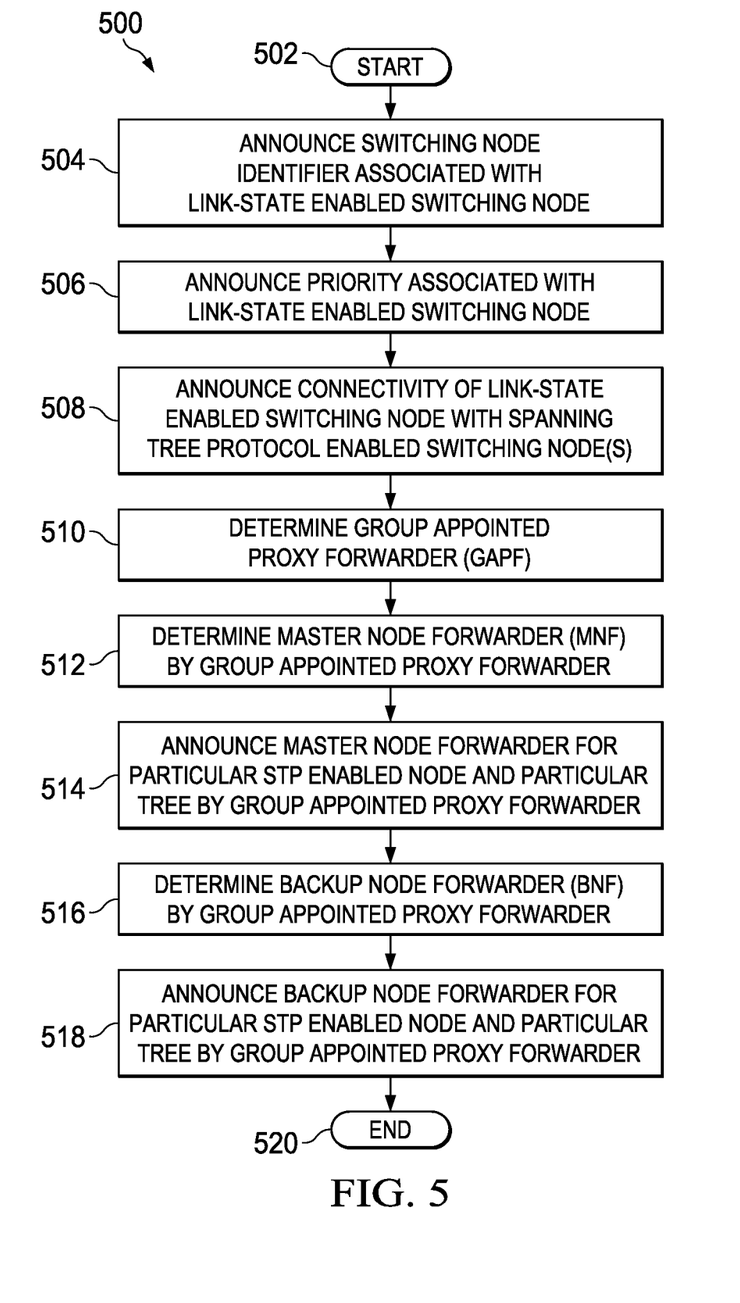
FIG. 5 is a simplified flowchart illustrating one embodiment of a procedure for providing n-way link-state routing redundancy without peer links in a network environment.

Referring now to FIG. 5, FIG. 5 is a simplified flowchart illustrating one embodiment of a procedure 500 for providing n-way link-state routing redundancy without peer links in a network environment. In various embodiments, procedure 500 is performed by one or more link-state protocol enabled switching nodes of a plurality of link-state protocol enabled switching nodes that are configured to run the n-way link-state routing of the present description. In one or more embodiments, the link-state protocol enabled switching node is one or more of the switches 104a-104d of FIG. 1. Procedure 500 starts at 502. In 504, the link-state protocol enabled switching node announces (or broadcasts) a switching node identifier associated with the link-state protocol enabled switching node to the plurality of link-state protocol enabled switching nodes. In one or more embodiments, the switching node identifier is a switch ID associated with the link-state protocol enabled switching node. In a particular embodiment, the switch ID is the link-state protocol enabled switching node's backplane MAC address, which is a six-byte value, which may be used to uniquely identify each of the switches 104a-104g within the network.

In 506, the link-state protocol enabled switching node announces (or broadcasts) a priority associated with the link-state protocol enabled switching node to the plurality of link-state protocol enabled switching nodes. In 508, the link-state protocol enabled switching node announces (or broadcasts) connectivity information of the link-state protocol enabled switching node with one or more spanning tree protocol (STP) enabled switching nodes to the plurality of link-state protocol enabled switching nodes over the link-state protocol cloud without requiring a physical peer link between the link-state protocol enabled switching nodes. In a particular embodiment, the connectivity information includes an emulated switch ID associated with a particular STP enabled switching node. In at least one embodiment, the connectivity information may further include a status of the connection with the STP enabled switching node such as whether the connection is in an UP or DOWN state. In a particular embodiment, the STP enabled switching nodes are one or more of classical Ethernet (CE) switching nodes 102a-102b.

In a particular embodiment, the connectivity information includes a list of CE switches 102a-102b that are connected to a particular edge switch 104a-104d. The edge switches 104a-104d know which CE switches 102a-102b they are connected to because when the links between any of the edge switches 104a-104d and CE switches 102a-102b start to come up, there is an exchange between edge switches 104a-104d and CE switches 102a-102b. Existing protocols are available to relay this information. Once this information is available, each of edge switches 104a-104d will announce that it is connected to one or more CE switches 102a-102b. Once this information is available at all nodes, this information is maintained within each of the edge switches 104a-104d in case one of the edge switches 104a-104d fails. In addition, the connectivity information is sent regularly between the edge switches 104a-104d.

In 510, a Group Appointed Proxy Forwarder (GAPF) is determined for the STP enabled switching node based upon the priority associated with each of the plurality of link-state protocol enabled switching nodes. In at least one embodiment, the link-state protocol enabled switching node with the highest priority is chosen as the GAPF. In the case of a tie, the link-state protocol enabled switching node having the higher MAC address is determined to be the GAPF. In a particular embodiment, the priority of the link-state protocol enabled switching node may include a default priority value that is user configurable. For example, a default priority of 64 may be chosen for all nodes. A user may configure a higher priority value to a link-state protocol enabled switching node that is believed to be unlikely to fail. Referring back to FIG. 4, an example is illustrated in which edge switch 104a is determined to be the GAPF. In 512, the GAPF determines a Master Node Forwarder (MNF) for the STP enabled switching node from among the plurality of link-state protocol enabled switching nodes based upon the connectivity information of each of the plurality of link-state protocol enabled switching nodes with the STP enabled switching node. The function of the MNF is to tie (or associate) the emulated switch ID of the STP enabled switching node onto a particular multicast tree of the cloud. For example, edge switch (S1) 104a acting as GAPF may determine that edge switch 104a will be the MNF and will tie the emulated switch ID of classical Ethernet switch (CE1) 102a to multicast tree 1. In 514, the GAPF announces the MNF for the particular STP enabled node and particular tree to the plurality of link-state protocol enabled switching nodes.

In step 516, the GAPF determines a Backup Node Forwarder for the STP enabled switching node from among the plurality of link-state protocol enabled switching nodes in case the MNF fails. For example, edge switch (S1) 104a may determine that edge switch (S2) 102b will be the BNF for the STP enabled switching node and tree 1 in case edge switch (S1) 102a fails. In 518, the GAPF announces the BNF for the particular STP enabled switching node and particular tree so that the BNF can assume the role of the MNF in case the MNF fails. In some embodiments, the GAPF may further perform the function of selected a Backup Group Appointed Proxy Forwarder (BGAPF). The function of the BAGPF is to assume the role of the GAPF in case the GAPF fails. In 520, procedure 500 ends. Upon completion of procedure 500 traffic can now flow from the STP enabled switching nodes through the cloud including the link-state protocol enabled switching nodes.

Operations 510-518 of procedure 500 will be performed for each of the STP enabled switching nodes and trees. For example, edge switch 104a acting as the GAPF will determine a MNF and BNF to tie an emulated switch ID associated with classical Ethernet switch (CE2) 102b on tree 2.

Figure 6:
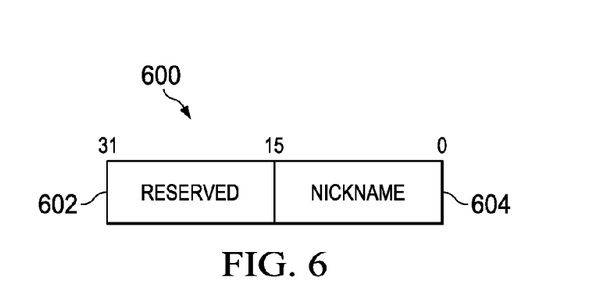
FIG. 6 illustrates an embodiment of a TLV (type-length-value) data element for advertising a nickname for a classical Ethernet (CE) switch by an edge switch.

Referring now to FIG. 6, FIG. 6 illustrates an embodiment of a TLV (type-length-value) data element 600 for advertising a nickname for a classical Ethernet (CE) switch by an edge switch. In the particular embodiment illustrated in FIG. 6, the data element 600 is a 32-bit data element that includes a 16-bit RESERVED field 602 and a 16-bit NICKNAME field 604. In a particular embodiment, the RESERVED field 602 is set to 0 at transmission and Ignored at the receiver. The NICKNAME field 604 is set to the classical Ethernet (CE) switch or bridge nickname. In one or more embodiments, the NICKNAME field 604 is set to the emulated switch ID of the CE switch or bridge. In a particular embodiment, the data element 600 is sent in a TRILL Layer 2 Reachability TLV and the value of the NICKNAME filed 604 is set to legal nickname value and not set to reserved value. In a particular embodiment, the data element 600 is transmitted as a sub-TLV within a router capability TLV. In one or more embodiments, the edge switch withdraws the TRILL Layer 2 reachability TLV when it has no longer has links, that is no local connectivity to the CE switch or bridge it previously announced as reachable. In still other embodiments, the nickname for the nickname for the CE switch can be advertised using an existing nickname TLV instead of the date element 600.

Figure 7A:
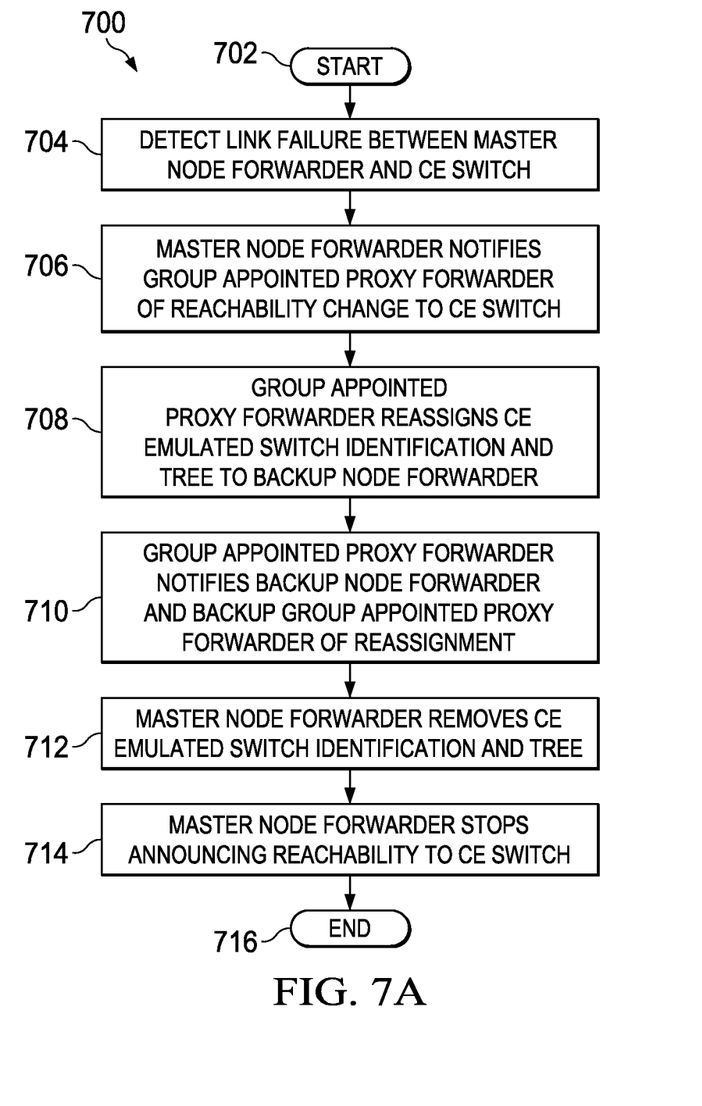
FIG. 7A is a simplified flowchart illustrating one embodiment of a procedure for providing for link failure recovery for a link failure between a Master Node Forwarder (MNF) and a classical Ethernet (CE) switch.

Referring now to FIG. 7A, FIG. 7A is a simplified flowchart illustrating one embodiment of a procedure 700 for providing for link failure recovery for a link failure between a Master Node Forwarder (MNF) and a classical Ethernet (CE) switch. In 702, procedure 700 begins. In 704, the MNF detects a link failure between the MNF and the CE switch. In a particular embodiment, the MNF detects a link failure between the MNF and the CE switch by detecting that HELLO messages are no longer exchanged between the MNF and the CE switch. In 706, the MNF notifies the Group Appointed Proxy Forwarder (GAPF) of the reachability change between the MNF and the CE switch indicating that the MNF can no longer reach the CE switch. In 708, the GAPF reassigns the CE emulated switch ID and tree to the BNF. In 710, the GAPF directly notifies the BNF and Backup GAPF (BGAPF) of the reassignment of the emulated switch ID and tree pair to the BNF. In 712, the MNF removes the CE emulated switch ID and tree when the link goes down to avoid packet duplication and looping. In 714, the MNF stops announcing its reachability to CE by pulling the CE emulated switch ID out of the affinity TLV and the nickname TLV. The MNF only reassigns upon receiving notification from the GAPF. In 716, procedure 700 ends.

Figure 7B:
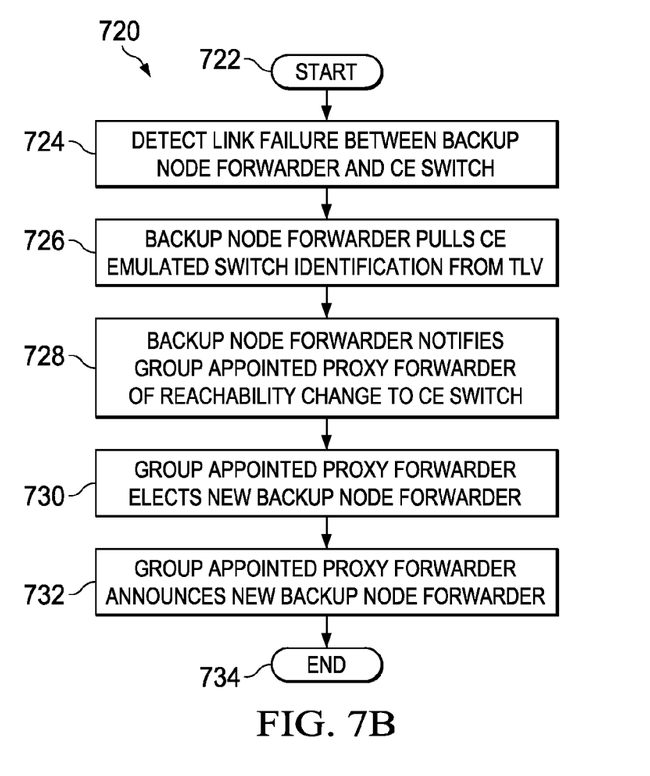
FIG. 7B is a simplified flowchart illustrating one embodiment of a procedure for providing for link failure recovery for a link failure between a Backup Node Forwarder (BNF) and a classical Ethernet (CE) switch.

Referring now to FIG. 7B, FIG. 7B is a simplified flowchart illustrating one embodiment of a procedure 720 for providing for link failure recovery for a link failure between a Backup Node Forwarder (BNF) and a classical Ethernet (CE) switch. In 722, procedure 720 begins. In 724, the BNF detects a link failure between the BNF and the CE switch. In a particular embodiment, the BNF detects a link failure between the BNF and the CE switch by detecting that HELLO messages are no longer exchanged between the BNF and the CE switch. In 726, the BNF pulls the CE emulated switch ID out of the nickname TLV. In 728, the BNF notifies the GAPF of the reachability change to the CE switch indicating that the CE switch is no longer reachable by the BNF. In 730, the GAPF elects a new BNF. In 732, the GAPF announces the new BNF to the network. In 734, procedure 720 ends.

Figure 7C:
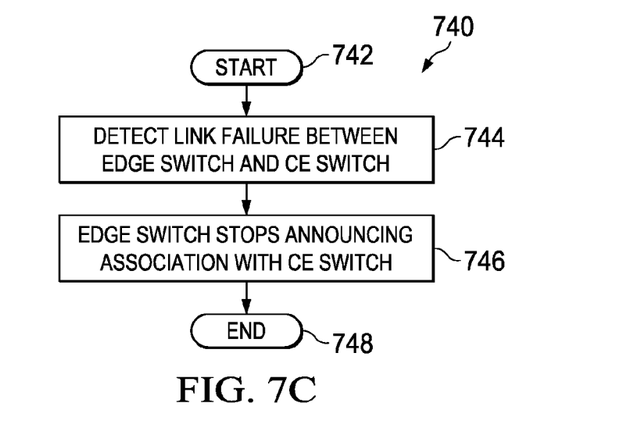
FIG. 7C is a simplified flowchart illustrating one embodiment of a procedure for providing for link failure recovery for a link failure between an edge switch and a classical Ethernet (CE) switch.

Referring now to FIG. 7C, FIG. 7C is a simplified flowchart illustrating one embodiment of a procedure 740 for providing for link failure recovery for a link failure between an edge switch and a classical Ethernet (CE) switch. In procedure 740 of FIG. 7C, the edge (or boundary) switch is not a GAPF, BGAPF, MNF, or BNF. In 742, procedure 740 begins. In 744, the edge switch detects link failure between the edge switch and the CE switch. In a particular embodiment, the edge switch detects a link failure between the edge switch and the CE switch by detecting that HELLO messages are no longer exchanged between the edge switch and the CE switch. In 746, the edge switch stops announcing its association with the CE switch in the hello messages so that it is not picked for delivering traffic to the CE switch in case other links fail. In 748, procedure 740 ends.

Figure 8A:
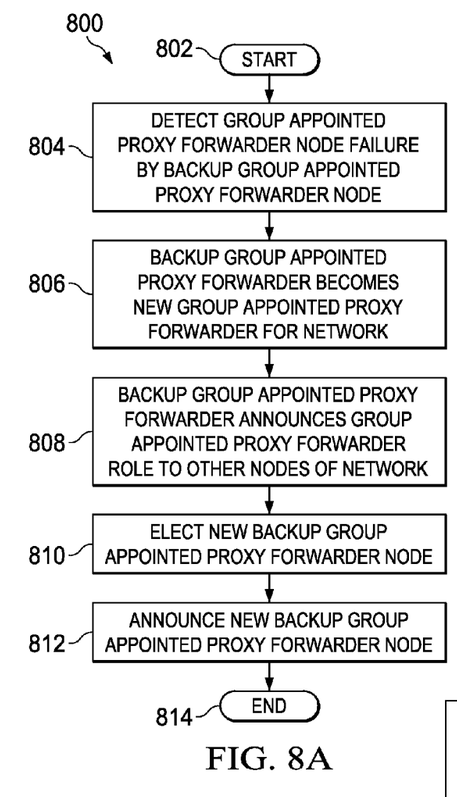
FIG. 8A is a simplified flowchart illustrating one embodiment of a procedure for providing for node failure recovery for a Group Appointed Proxy Forwarder (GAPF) node failure.

Referring now to FIG. 8A, FIG. 8A is a simplified flowchart illustrating one embodiment of a procedure 800 for providing for node failure recovery for a Group Appointed Proxy Forwarder (GAPF) node failure. In 802, procedure 800 begins. In 804, the Backup Group Appointed Proxy Forwarder (BGAPF) node detects that the GAPF node has failed. In a particular embodiment, the BGAPF node detects that the GAPF node has failed by detecting that a HELLO message time-out period has expired. In 806, the BGAPF becomes the new GAPF for the network. In 808, the BGAPF node (new GAPF) announces its new role as the GAPF node to the other nodes in the network. In 810, the new GAPF node (previous BGAPF node) elects a new BGAPF node for the network. In 812, the new GAPF node (previous BGAPF node) announces the new BGAPF node to the other nodes in the network. In 814, procedure 800 ends.

Figure 8B:
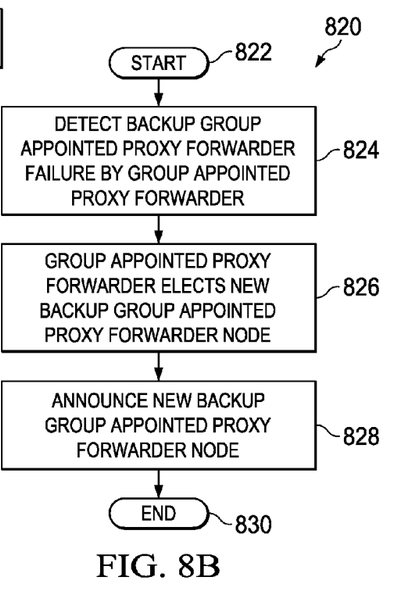
FIG. 8B is a simplified flowchart illustrating one embodiment of a procedure for providing for node failure recovery for a Backup Group Appointed Proxy Forwarder (BGAPF) node failure.

Referring now to FIG. 8B, FIG. 8B is a simplified flowchart illustrating one embodiment of a procedure 820 for providing for node failure recovery for a Backup Group Appointed Proxy Forwarder (BGAPF) node failure. In 822, procedure 820 begins. In 824, the GAPF node detects that the BGAPF node has failed. In a particular embodiment, the GAPF node detects that the BGAPF node has failed by detecting an expiry of a HELLO message time out period. In 826, the GAPF node elects a new BGAPF node. In 828, the GAPF announces the new BGAPF node to the other nodes of the network. In 830, procedure 800 ends.

Figure 8C:
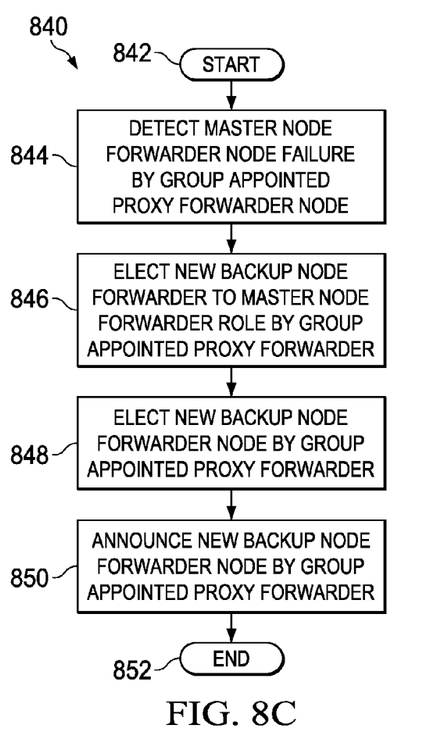
FIG. 8C is a simplified flowchart illustrating one embodiment of a procedure for providing for node failure recovery for a Master Node Forwarder (MNF) node failure.

Referring now to FIG. 8C, FIG. 8C is a simplified flowchart illustrating one embodiment of a procedure 840 for providing for node failure recovery for a Master Node Forwarder (MNF) node failure. In 842, procedure 840 begins. In 844, the GAPF node detects that the MNF node has failed. In a particular embodiment, the GAPF node detects that the MNF node has failed based upon a HELLO message time out period expiry. In 846, the GAPF node elects the BNF to the MNF role. The new MNF node then starts announcing its association to the classical Ethernet (CE) switch on the tree that the old MNF was announcing affinity to. In 848, the GAPF node elects a new BNF node. In 850, the GAPF announces the new BNF node to the other nodes of the network. In 852, procedure 840 ends.

Figure 8D:
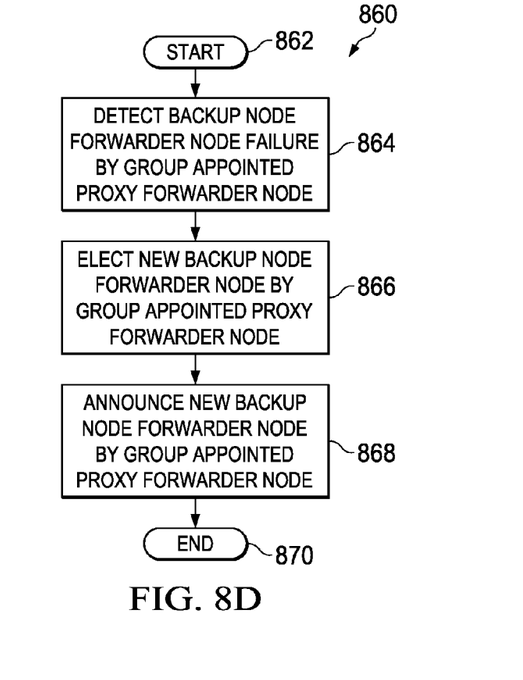
FIG. 8D is a simplified flowchart illustrating one embodiment of a procedure for providing for node failure recovery for a Backup Node Forwarder (BNF) node failure.

Referring now to FIG. 8D, FIG. 8D is a simplified flowchart illustrating one embodiment of a procedure 860 for providing for node failure recovery for a Backup Node Forwarder (BNF) node failure. In 862, procedure 860 begins. In 864, the GAPF node detects that the BNF node has failed. In a particular embodiment, the GAPF node detects that the BNF node has failed based upon a HELLO message time out period expiry. In 866, the GAPF node elects a new BNF node for the network. In 868, the GAPF node announces the new BNF node to the network. In 870, procedure 860 ends.

Note that in certain example implementations, the n-way link-state routing redundancy functions outlined herein may be implemented by logic encoded in one or more tangible non-transitory media (e.g., embedded logic provided in an application specific integrated circuit [ASIC], digital signal processor [DSP] instructions, software [potentially inclusive of object code and source code] to be executed by a processor, or other similar machine, etc.). In some of these instances, a memory element [as shown in FIG. 3] can store data used for the operations described herein. This includes the memory element being able to store software, logic, code, or processor instructions that are executed to carry out the activities described in this Specification. A processor can execute any type of instructions associated with the data to achieve the operations detailed herein in this Specification. In one example, the processor [as shown in FIG. 3] could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array [FPGA], an erasable programmable read only memory (EPROM), an electrically erasable programmable ROM (EEPROM)) or an ASIC that includes digital logic, software, code, electronic instructions, or any suitable combination thereof.

In one example implementation, switches 104a-104n may include software in order to achieve the n-way link-state routing redundancy functions outlined herein. These activities can be facilitated by routing table 308 and/or n-way link-state routing protocol module 310 (where these modules can be suitably combined in any appropriate manner, which may be based on particular configuration and/or provisioning needs). Switches 104a-104n can include memory elements for storing information to be used in achieving the n-way link-state routing redundancy activities, as discussed herein. Additionally, switches 104a-104n may include a processor that can execute software or an algorithm to perform the n-way link-state routing redundancy operations, as disclosed in this Specification. These devices may further keep information in any suitable memory element [random access memory (RAM), ROM, EPROM, EEPROM, ASIC, etc.], software, hardware, or in any other suitable component, device, element, or object where appropriate and based on particular needs. Any of the memory items discussed herein (e.g., database, tables, trees, cache, etc.) should be construed as being encompassed within the broad term 'memory element.' Similarly, any of the potential processing elements, modules, and machines described in this Specification should be construed as being encompassed within the broad term 'processor.' Each of the network elements can also include suitable interfaces for receiving, transmitting, and/or otherwise communicating data or information in a network environment.

Note that with the example provided above, as well as numerous other examples provided herein, interaction may be described in terms of two, three, or more network elements. However, this has been done for purposes of clarity and example only. In certain cases, it may be easier to describe one or more of the functionalities of a given set of flows by only referencing a limited number of network elements. It should be appreciated that communication system 100 (and its teachings) are readily scalable and can accommodate a large number of components, as well as more complicated/sophisticated arrangements and configurations. Accordingly, the examples provided should not limit the scope or inhibit the broad teachings of communication system 100 as potentially applied to a myriad of other architectures.

It is also important to note that the steps in the preceding flow diagrams illustrate only some of the possible signaling scenarios and patterns that may be executed by, or within, communication system 100. Some of these steps may be deleted or removed where appropriate, or these steps may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by communication system 100 in that any suitable arrangements, chronologies, configurations, and timing mechanisms may be provided without departing from the teachings of the present disclosure.

Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain endpoint components and certain protocols, communication system 100 may be applicable to other protocols and arrangements. Moreover, communication system 100 can be extended to any link-state routing architecture.

Although communication system 100 has been illustrated with reference to particular elements and operations that facilitate the communication process, these elements and operations may be replaced by any suitable architecture or process that achieves the intended functionality of communication system 100.

What is claimed is:

1. A method, comprising:
    broadcasting a switching node identifier associated with a first link-state protocol enabled switching node to a plurality of link-state protocol enabled switching nodes, the plurality of link-state protocol enabled switching nodes capable of communication with one another by a link-state protocol cloud;
    broadcasting a priority associated with the first link-state protocol enabled switching node to the plurality of link-state protocol enabled switching nodes;
    broadcasting connectivity information of the first link-state protocol enabled switching node to the plurality of link-state protocol enabled switching nodes using the link-state protocol cloud, the connectivity information including connectivity of the first link-state protocol enabled switching node with at least one spanning tree protocol enabled switching node; and
    determining a proxy forwarder node for the at least one spanning tree protocol enabled switching node based upon a priority associated with each of the plurality of link-state protocol enabled switching nodes, the proxy forwarder node configured to determine a master node forwarder for the at least one spanning tree protocol enabled switching node from the plurality of link-state protocol enabled nodes.

2. The method of claim 1, further comprising:
    associating an identifier of the at least one spanning tree protocol enabled switching node to a multicast tree of the link-state protocol cloud.

3. The method of claim 2, wherein the identifier of the at least one spanning tree protocol enabled switching node is an emulated switch identifier associated with the at least one spanning tree protocol enabled switching node.

4. The method of claim 1, wherein the proxy forwarder node determines the master node forwarder based upon connectivity information of each of the plurality of link-state protocol enabled switching nodes with the at least one spanning tree protocol enabled switching node.

5. The method of claim 2, further comprising:
    determining a backup node forwarder for the at least one spanning tree protocol enabled switching node, the backup node forwarder configured to associate the identifier of the at least one spanning tree protocol enabled switching node to the multicast tree if the master node forwarder is determined to not be reachable by the master node forwarder.

6. The method of claim 1, further comprising:
    determining a backup proxy forwarder node, the backup proxy forwarder node configured to determine the master node forwarder for the at least one spanning tree protocol enabled switching node if the proxy forwarder node is determined to be failed.

7. Logic encoded in one or more non-transitory media that includes code for execution and when executed by a processor operable to perform operations comprising:
    broadcasting a switching node identifier associated with a first link-state protocol enabled switching node to a plurality of link-state protocol enabled switching nodes, the plurality of link-state protocol enabled switching nodes capable of communication with one another by a link-state protocol cloud;
    broadcasting a priority associated with the first link-state protocol enabled switching node to the plurality of link-state protocol enabled switching nodes;
    broadcasting connectivity information of the first link-state protocol enabled switching node to the plurality of link-state protocol enabled switching nodes using the link-state protocol cloud, the connectivity information including connectivity of the first link-state protocol enabled switching node with at least one spanning tree protocol enabled switching node; and
    determining a proxy forwarder node for the at least one spanning tree protocol enabled switching node based upon a priority associated with each of the plurality of link-state protocol enabled switching nodes, the proxy forwarder node configured to determine a master node forwarder for the at least one spanning tree protocol enabled switching node from the plurality of link-state protocol enabled nodes.

8. The logic of claim 7, wherein the operations further include associating an identifier of the at least one spanning tree protocol enabled switching node to a multicast tree of the link-state protocol cloud.

9. The logic of claim 8, wherein the identifier of the at least one spanning tree protocol enabled switching node is an emulated switch identifier associated with the at least one spanning tree protocol enabled switching node.

10. The logic of claim 7, wherein the proxy forwarder node determines the master node forwarder based upon connectivity information of each of the plurality of link-state protocol enabled switching nodes with the at least one spanning tree protocol enabled switching node.

11. The logic of claim 8, wherein the operations further include determining a backup node forwarder for the at least one spanning tree protocol enabled switching node, the backup node forwarder configured to associate the identifier of the at least one spanning tree protocol enabled switching node to the multicast tree if the master node forwarder is determined to not be reachable by the master node forwarder.

12. The logic of claim 7, further the operations further include determining a backup proxy forwarder node, the backup proxy forwarder node configured to determine the master node forwarder for the at least one spanning tree protocol enabled switching node if the proxy forwarder node is determined to be failed.

13. An apparatus, comprising:
a memory element configured to store data;
a processor operable to execute instructions associated with the data; and
a link-state protocol module, the apparatus being configured to:
broadcast a switching node identifier associated with a first link-state protocol enabled switching node to a plurality of link-state protocol enabled switching nodes, the plurality of link-state protocol enabled switching nodes capable of communication with one another by a link-state protocol cloud;
broadcast a priority associated with the first link-state protocol enabled switching node to the plurality of link-state protocol enabled switching nodes;
broadcast connectivity information of the first link-state protocol enabled switching node to the plurality of link-state protocol enabled switching nodes using the link-state protocol cloud, the connectivity information including connectivity of the first link-state protocol enabled switching node with at least one spanning tree protocol enabled switching node; and
determine a proxy forwarder node for the at least one spanning tree protocol enabled switching node based upon a priority associated with each of the plurality of link-state protocol enabled switching nodes, the proxy forwarder node configured to determine a master node forwarder for the at least one spanning tree protocol enabled switching node from the plurality of link-state protocol enabled nodes.

14. The apparatus of claim 13, wherein the apparatus is further configured to associate an identifier of the at least one spanning tree protocol enabled switching node to a multicast tree of the link-state protocol cloud.

15. The apparatus of claim 14, wherein the identifier of the at least one spanning tree protocol enabled switching node is an emulated switch identifier associated with the at least one spanning tree protocol enabled switching node.

16. The apparatus of claim 13, wherein the proxy forwarder node is configured to determine the master node forwarder based upon connectivity information of each of the plurality of link-state protocol enabled switching nodes with the at least one spanning tree protocol enabled switching node.

17. The apparatus of claim 14, wherein the apparatus is further configured to determine a backup node forwarder for the at least one spanning tree protocol enabled switching node, the backup node forwarder configured to associate the identifier of the at least one spanning tree protocol enabled switching node to the multicast tree if the master node forwarder is determined to not be reachable by the master node forwarder.

18. The apparatus of claim 13, wherein the apparatus is further configured to determine a backup proxy forwarder node, the backup proxy forwarder node configured to determine the master node forwarder for the at least one spanning tree protocol enabled switching node if the proxy forwarder node is determined to be failed.

* * * * *